United States Patent [19]

Cornelissen et al.

[11] Patent Number: 5,065,868
[45] Date of Patent: Nov. 19, 1991

[54] PACKAGE CONSISTING OF A PAPER BAG COMPACTLY PACKING COMPRESSED FLEXIBLE ARTICLES

[76] Inventors: Roger E. Cornelissen, c/o Grupo Arbora, Via Augusta 2 bis, 08006 Barcelona, Spain; Claus C. F. Haubach; Agustin R. Blanco, both c/o Procter & Gamble GmbH, Sulzbacherstrasse 40, 6231 Schwalbach, Fed. Rep. of Germany

[21] Appl. No.: 602,445

[22] Filed: Oct. 23, 1990

[51] Int. Cl.$^5$ ............................. B65D 85/16; B65D 85/18
[52] U.S. Cl. ............................. 206/494; 206/83.5; 206/440; 206/628; 383/10; 383/119; 383/66; 383/200; 229/237
[58] Field of Search .................. 206/83.5, 438, 440, 206/494, 607, 609–611, 614, 615, 620, 626, 628, 630, 632; 383/8, 10, 120

[56] References Cited

U.S. PATENT DOCUMENTS

| | | |
|---|---|---|
| D. 135,538 | 4/1943 | Kaplan . |
| 655,998 | 8/1900 | Taylor . |
| 1,261,612 | 4/1918 | Powers . |
| 1,494,518 | 5/1924 | Whippey ............................. 206/626 |
| 1,733,219 | 10/1929 | Duvall . |
| 1,920,841 | 8/1933 | Clark ............................. 100/14 |
| 2,011,236 | 8/1935 | Winter et al. . |
| 2,127,118 | 8/1938 | Herbelin ............................. 100/14 |
| 2,196,185 | 4/1940 | Belcher . |
| 2,270,617 | 1/1942 | Bennett ............................. 206/629 |
| 2,459,130 | 1/1949 | Jones ............................. 206/626 |
| 2,473,492 | 6/1949 | Shina ............................. 206/626 |
| 2,478,412 | 8/1949 | McMahan . |
| 2,506,021 | 5/1950 | Holmberg . |
| 2,693,304 | 11/1954 | Davis et al. ............................. 227/18 |
| 2,700,459 | 1/1955 | Anspacher . |
| 2,750,096 | 6/1956 | Misch ............................. 206/607 |
| 2,766,922 | 10/1956 | Moore ............................. 206/626 |
| 2,781,161 | 2/1957 | Adams . |
| 2,866,586 | 12/1958 | Moore ............................. 206/607 |
| 2,998,911 | 9/1961 | Hahn et al. . |
| 3,002,674 | 10/1961 | Wright ............................. 229/51 |
| 3,006,119 | 10/1961 | Fingerhut . |
| 3,044,228 | 7/1962 | Peterson . |
| 3,056,245 | 10/1962 | Baum et al. . |
| 3,059,387 | 10/1962 | Fasanella . |
| 3,117,513 | 1/1964 | Burnett et al. ............................. 100/215 |
| 3,124,298 | 3/1964 | Repko . |
| 3,161,336 | 12/1964 | Loescher ............................. 225/106 |
| 3,173,188 | 3/1965 | Wexler ............................. 28/1 |
| 3,206,105 | 9/1965 | Smith . |
| 3,227,359 | 1/1966 | Hanlon . |
| 3,327,449 | 6/1967 | Hullhorst et al. . |
| 3,354,600 | 11/1967 | Hoffmann ............................. 53/24 |
| 3,361,041 | 1/1968 | Grob . |
| 3,370,630 | 2/1968 | Haugh et al. . |

(List continued on next page.)

FOREIGN PATENT DOCUMENTS

| | | |
|---|---|---|
| 258573 | 3/1988 | European Pat. Off. . |
| 349050 | 1/1990 | European Pat. Off. . |
| 3102192 | 9/1982 | Fed. Rep. of Germany . |
| 3629563 | 8/1986 | Fed. Rep. of Germany . |
| 3642327 | 8/1986 | Fed. Rep. of Germany . |
| 8621549 | 11/1986 | Fed. Rep. of Germany . |
| 1022595 | 3/1966 | United Kingdom . |
| 1282769 | 8/1972 | United Kingdom . |
| 2035258 | 6/1980 | United Kingdom . |

*Primary Examiner*—Jimmy G. Foster

[57] ABSTRACT

A paper bag containing flexible articles maintained in a state of compression in a direction substantially parallel to their thickness. In a particularly preferred embodiment, the bag totally encloses the stack of compressed flexible articles and exhibits a substantially rectilinear shape. The bag preferably includes an opening device in one of the side panels. The opening device contains an internal reinforcement sheet made of biodegradable and/or recyclable material. The reinforcement sheet provides additional support for the opening device that is under tension created by the compression of the flexible articles. At the lowermost end of the opening device there exists a loose flap which creates an aperture in the side panel when a manual grasping force is applied to the tear flap. The bag preferably includes a carrying device provided in an extension of the top panel of the paper bag.

19 Claims, 6 Drawing Sheets

U.S. PATENT DOCUMENTS

| | | | |
|---|---|---|---|
| 3,381,440 | 5/1968 | Hullhorst . | |
| 3,513,628 | 5/1970 | Lee et al. | 53/124 |
| 3,514,033 | 5/1970 | Goodwin . | |
| 3,548,723 | 12/1970 | Sengewald . | |
| 3,593,622 | 7/1971 | Sengewald . | |
| 3,605,570 | 9/1971 | Goodwin . | |
| 3,626,656 | 12/1971 | Langenscheidt . | |
| 3,660,964 | 5/1972 | Willis et al. . | |
| 3,729,886 | 5/1973 | Lucas et al. . | |
| 3,792,564 | 2/1974 | Brady, Jr. . | |
| 3,818,673 | 6/1974 | Rollins et al. . | |
| 3,824,759 | 7/1974 | Finn et al. . | |
| 3,908,539 | 9/1975 | O'Brien | 100/49 |
| 3,977,596 | 8/1976 | Gamble . | |
| 4,031,815 | 6/1977 | Verbeke . | |
| 4,047,362 | 9/1977 | Lister et al. . | |
| 4,056,919 | 11/1977 | Hirsch | 53/124 |
| 4,062,169 | 12/1977 | Lister et al. . | |
| 4,074,508 | 2/1978 | Reid . | |
| 4,141,193 | 2/1979 | Joa | 53/529 |
| 4,182,237 | 1/1980 | O'Brien | 100/35 |
| 4,216,899 | 8/1980 | Kamp . | |
| 4,241,562 | 12/1980 | Meyer | 53/438 |
| 4,242,854 | 1/1981 | Nissen | 53/529 |
| 4,252,269 | 2/1981 | Peppiatt . | |
| 4,328,655 | 5/1982 | Spencer et al. | 53/439 |
| 4,414,788 | 11/1983 | Berg | 53/436 |
| 4,501,107 | 2/1985 | Piotrowski | 53/438 |
| 4,539,705 | 9/1985 | Baines | 383/8 |
| 4,550,439 | 10/1985 | Peppiatt et al. | 383/8 |
| 4,573,203 | 2/1986 | Peppiatt | 383/8 |
| 4,577,453 | 3/1986 | Hofeler | 53/438 |
| 4,602,472 | 7/1986 | Ampolini et al. | 53/438 |
| 4,604,084 | 8/1986 | Pistner | 493/226 |
| 4,605,392 | 8/1986 | Achelpohl et al. | 493/196 |
| 4,607,388 | 8/1986 | Koiyumaki et al. | 383/121 |
| 4,608,808 | 9/1986 | Ryan et al. | 53/436 |
| 4,609,366 | 9/1986 | Ley et al. | 493/22 |
| 4,610,029 | 9/1986 | Huhtala et al. | 383/10 |
| 4,613,988 | 9/1986 | Maddock | 383/8 |
| 4,628,535 | 12/1986 | Tetenborg | 383/24 |
| 4,632,244 | 12/1986 | Landau | 206/219 |
| 4,633,649 | 1/1987 | Gautier et al. | 53/413 |
| 4,636,191 | 1/1987 | Piggott | 403/227 |
| 4,638,913 | 1/1987 | Howe, Jr. | 206/632 |
| 4,660,352 | 4/1987 | Deines et al. | 53/438 |
| 4,660,354 | 4/1987 | Lancaster et al. | 53/469 |
| 4,661,989 | 4/1987 | Risby | 383/2 |
| 4,664,957 | 5/1987 | van de Pol | 428/35 |
| 4,677,810 | 7/1987 | Spano | 53/428 |
| 4,685,276 | 8/1987 | Kiel | 53/459 |
| 4,686,815 | 8/1987 | Zils et al. | 53/469 |
| 4,688,369 | 8/1987 | Cornish et al. | 53/436 |
| 4,688,370 | 8/1987 | Dighton et al. | 53/469 |
| 4,688,372 | 8/1987 | Langen et al. | 53/529 |
| 4,691,369 | 9/1987 | Costa | 383/17 |
| 4,694,638 | 9/1987 | Maddux, Jr. et al. | 53/459 |
| 4,696,050 | 9/1987 | Sengewald | 383/10 |
| 4,696,145 | 9/1987 | Schmidt et al. | 53/436 |
| 4,699,608 | 10/1987 | Pistner | 493/204 |
| 4,702,731 | 10/1987 | Lambrecht et al. | 493/196 |
| 4,703,517 | 10/1987 | Marino | 383/7 |
| 4,704,100 | 11/1987 | Kaufman | 493/194 |
| 4,706,440 | 11/1987 | Bittner | 53/438 |
| 4,710,967 | 12/1987 | Petschner | 383/8 |
| 4,711,066 | 12/1987 | Fox et al. | 53/436 |
| 4,711,067 | 12/1987 | Magni | 53/439 |
| 4,713,135 | 12/1987 | Bridgeford | 156/218 |
| 4,713,839 | 12/1987 | Peppiatt | 383/29 |
| 4,715,635 | 12/1987 | Koskinen | 294/68.1 |
| 4,717,262 | 1/1988 | Roen et al. | 383/120 |
| 4,720,872 | 1/1988 | Kaczerwaski | 383/8 |
| 4,721,396 | 1/1988 | Sengewald | 383/8 |
| 4,730,942 | 3/1988 | Fulcher | 383/7 |
| 4,730,943 | 3/1988 | Johnson | 383/8 |
| 4,738,078 | 4/1988 | Benz et al. | 53/439 |
| 4,738,546 | 4/1988 | Sengewald | 383/7 |
| 4,756,141 | 7/1988 | Hirsch et al. | 53/438 |
| 4,846,587 | 7/1989 | Hull | 383/10 |
| 4,854,733 | 8/1989 | Schwinn | 383/29 |
| 4,874,255 | 10/1989 | Ball et al. | 383/8 |
| 4,934,535 | 6/1990 | Muckenfuhs et al. | 206/610 |
| 4,966,286 | 10/1990 | Muckenfuhs | 206/610 |

PACKAGE CONSISTING OF A PAPER BAG COMPACTLY PACKING COMPRESSED FLEXIBLE ARTICLES

TECHNICAL FIELD

This invention relates to a package consisting of a paper bag compactly packing compressed flexible articles. More particularly it relates to a unique assembly of certain qualities of paper in combination with specific design structures for composing the paper bag for compact packing of the compressed flexible articles and removing these packed articles, and the condition into which the flexible articles are brought at the time they are packed.

BACKGROUND ART

Flexible articles, like for example disposable diapers, are mostly packed either in cardboard boxes or in flexible bags made of plastic film. Cardboard is heavy, takes more space than plastic; gives less flexibility for storing since it is rigid and, in use, continues to take up the same amount of space, even when practically empty. On the other hand, it has the advantage of being naturerenewable and biodegradable or recyclable since paper recycling facilities are already in place. Plastic bags, which are lighter and allow more flexibility, are not biodegradable and, although techniques are being developed to recycle plastic, no recycling facilities are in place yet.

In order to decrease the quantity of packaging material needed for packing flexible articles, technologies have been developed to compress such flexible articles before packing them, which have led to a reduction of cost of such packing material and to a reduction of empty packing material to dispose of, which is an environmental benefit Equipment to compress such flexible articles is readily available on the market. EPO patent application 89201611.4 describes an opening device for flexible bags filled with such compressed flexible articles. Flexible bags filled with compressed flexible articles according to European patent application 89201611.4 are found on the market since November 1988. The executions available are made of polyethylene, which is a plastic material which is not easily biodegradable and for which recycling facilities are not yet in place, although they are being developed. There is consequently a need for finding a way to pack flexible articles, which have been compressed, in a more environmentally friendly outer container.

SUMMARY OF THE INVENTION

It is an object of the present invention to provide a package consisting of a paper bag with compactly packed compressed flexible articles.

It is another object of the invention to provide such a paper bag for compact packing of flexible articles which can be easily filled and subsequently sealed and which is then shape-retaining.

It is still another object of the invention to provide a paper bag for compact packing of flexible articles which can easily be opened to the extent necessary for getting access to the compressed flexible articles it contains, without the risk of destroying the bag to such an extent that it no longer protects the unused compressed flexible articles it still contains.

It is still a further object of the invention to provide a paper bag for compact packing of flexible articles which is more easily biodegradable or recyclable.

It is an additional object of the invention to provide a paper bag for compact packing of flexible articles which not only has high environmental qualities and sufficient strength, but has also good printing qualities on its external surface so that an attractively looking package can be provided.

The aforementioned and other objects of the invention will become more apparent hereinafter.

In accordance with the objects of the present invention, there is provided a paper bag dimensioned so as to compactly pack compressed flexible articles and to maintain these articles in their compressed form. Furthermore, means for closing, carrying and opening the paper bags with compactly packed flexible articles are disclosed.

It has been found that, in order to be able to satisfactorily use biodegradable and/or easily recyclable paper material for making bags for flexible articles, it is important that the flexible articles and the paper bag form a compact, solid unit. Indeed, as is well known, paper, which is not maintained in stretched form by a supporting element, will easily get wrinkled and subsequently torn or punctured. This is also the case when flexible articles, like diapers, are packed in the bag. By compressing such flexible articles and dimensioning a paper bag to exactly the format of the compressed flexible articles to be packed, the interaction between these compressed flexible articles and the paper bag results in a strong, resistant and, as long as it is unopened, shape-retaining package.

The invention has been tested with various qualities of paper, consisting of one or more layers to make the paper bag. It has been found that papers or combined layers of paper, having a total basis weight in the range of from 70 to 125 grams per square meter, are suitable. However, the qualities of paper that present the most advantages from the environmental point of view for making the bag which is an element of the present invention, are unbleached virgin papers or unbleached recycled papers. In order to be able to present an attractive package made with unbleached papers, it is, however, necessary to white-coat the outside of these papers to allow good quality printing. Experience has shown that high opacity coating of unbleached paper is problematic, since the paper has either to be made of light-colored fibers like unbleached mechanical wood pulp and/or high grammage coating of the paper layer is required. Either of these solutions is controversial since they detract form the good mechanical properties required for packing compressed articles in a paper bag.

For the above reasons, the best results are found with a two-layer paper consisting of one layer of brown, unbleached kraft pulp/paper with good mechanical properties and one layer of light brown unbleached mechanical wood pulp/paper. As will be known to the man of ordinary skill in the art, such two-layer paper can be made either with a two or more screen papermaking machine whereby, in the end product, the kraft pulp layer will be at the inside of the bag and the mechanical wood pulp layer will be at the outside of the bag. Another solution is to have both layers made separately and subsequently glued together to form a laminate. It has been found that the glue laminated paper presents the best technical properties required for packing of compressed disposables, while still retaining the environmentally desirable properties.

In order to obtain a good printing surface for the final bag if this is desired, the layer of light brown unbleached mechanical wood pulp/paper can be low grammage white coated. Another back-up option would be to use a bleached paper quality with optimized environmental properties like (partially with oxygen) bleached paper. If such a paper is used, no white coating of the outer surface is needed to achieve a good quality basis for printing.

The bags made of paper can be filled with the compressed articles on conventional equipment. In a preferred embodiment, the flexible articles packed in the paper bags according to the invention are compressed to about 60 to 75% of their initial volume when they are introduced in the paper bag, where they return to about 40 to 55% compression volume at the end of the packing and sealing operation. The invention will, however, still work with lower ranges of compression.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DESCRIPTION OF THE PREFERRED EMBODIMENTS

Figure 1:
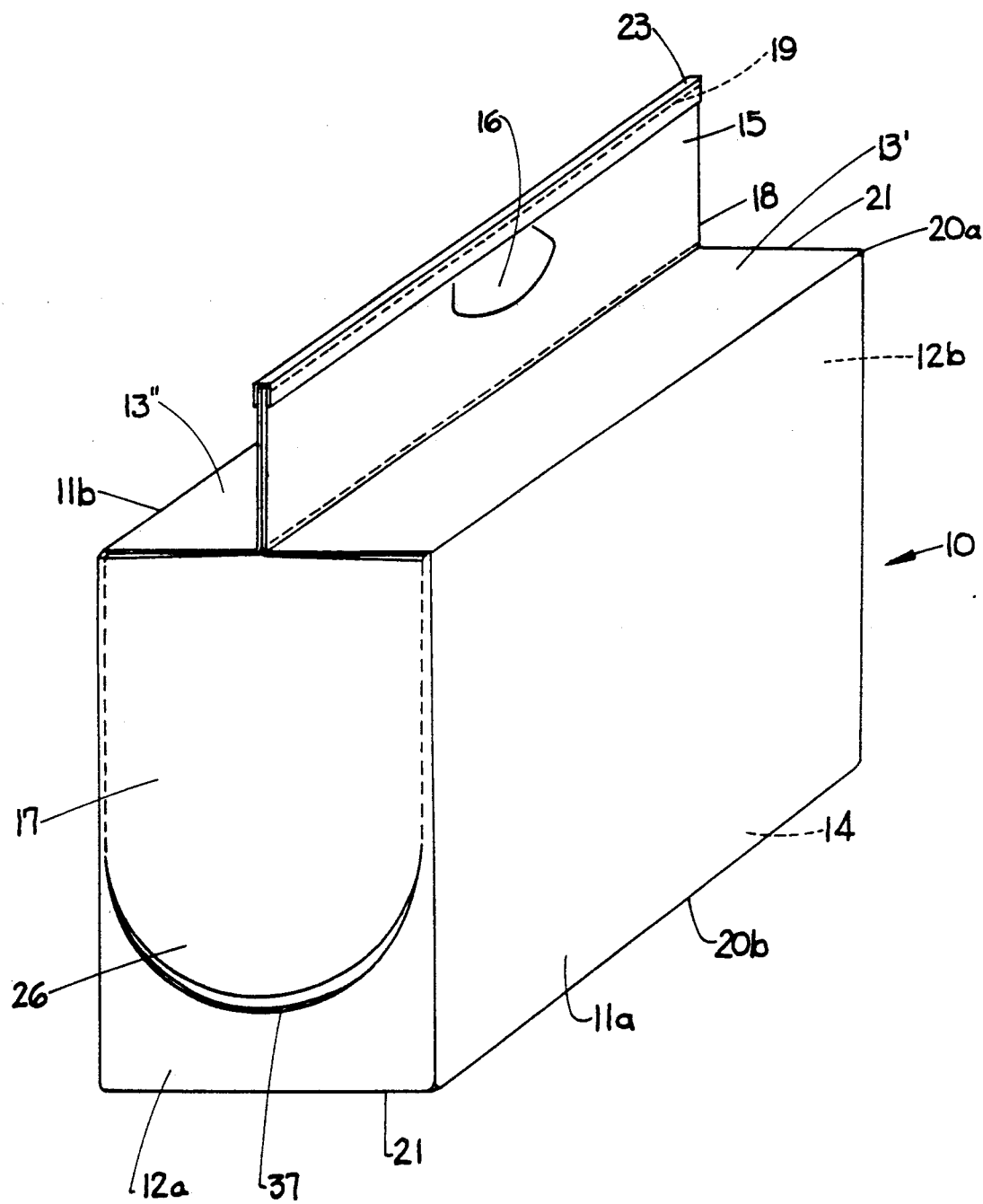
FIG. 1 is a perspective view of a preferred embodiment of the package consisting of a side gussetted paper bag compactly packing compressed flexible articles.

Referring now to the drawings in detail, wherein like reference numbers indicate the same elements throughout the use, there is illustrated a preferred embodiment of a package consisting of a paper bag compactly packing compressed flexible articles according to the present invention.

As can be seen from FIG. 1, package (10) has a generally parallelepipedic shape and represents a filled side gussetted paper bag consisting of front panel (11a), back panel (11b), side panels (12a and 12b), top panel (13) and bottom panel (14). Top panel (13) consists of top sections (13' and 13'') which are joined together at line (18) and form extension (15) in which carrying device (16) is provided. Opening device (17) with tear flap (26) are provided in side panel (12a).

Such a side gussetted paper bag is formed in a conventional way by folding paper from a roll into a side gussetted tube glued at the side seam and delivered as such or then cutting individual bags form the tube and group them into wickets. The top of the bag is closed before filling by sewing or thermosealing along line (18), thereby forming extension (15) which finishes in another line of sewing or thermosealing (19). Horizontal scorelines (20a and 20b) have been provided in the locations which will delimit the upper and lower edge of the stack of compressed articles to be inserted in the bag whereas diagonal scorelines (21) delimit the upper or both side edges of the stack of compressed articles to be packed. The scorelines provided in the upper part of the paper bag facilitate erecting the empty bag into a parallelepipedic shape for easy insertion through the bottom of the compressed articles to be packed, whereas the scorelines provided in the lower part of the paper bag facilitate the folding of the paper bag to form the bottom which is to be sealed or folded and glued after filling.

Once the bags have been filled with the compressed flexible articles, they are thermosealed or folded and glued on bottom panel (14) using a conventional means. It is, however, especially advantageous to close them with the help of a thermoactivated glue applied on the inside of the bag bottom during the paper printing in the bag forming process since this closing method allows the use of existing sealing equipments for polybags without the need for a plastic laminate.

The carrying device (16), which is provided in the extension (15), consists of a conventional grip-hole cutout. This grip-hole is reinforced by an intermediate layer of biodegradable material like unbleached paper board, or paper with cotton or other natural string reinforcement (22), as can be seen from FIG. 2.

At the time the upper extension (15) consisting of extensions of top panel sections (13' and 13'') is sewn together along its free edge, a U-shaped protective member (23) is slid over the free top edges of the extension (15) and is sewn in the same sewing operation (19). This U-shaped protective member is also made of biodegradable material, like paper.

Figure 3:
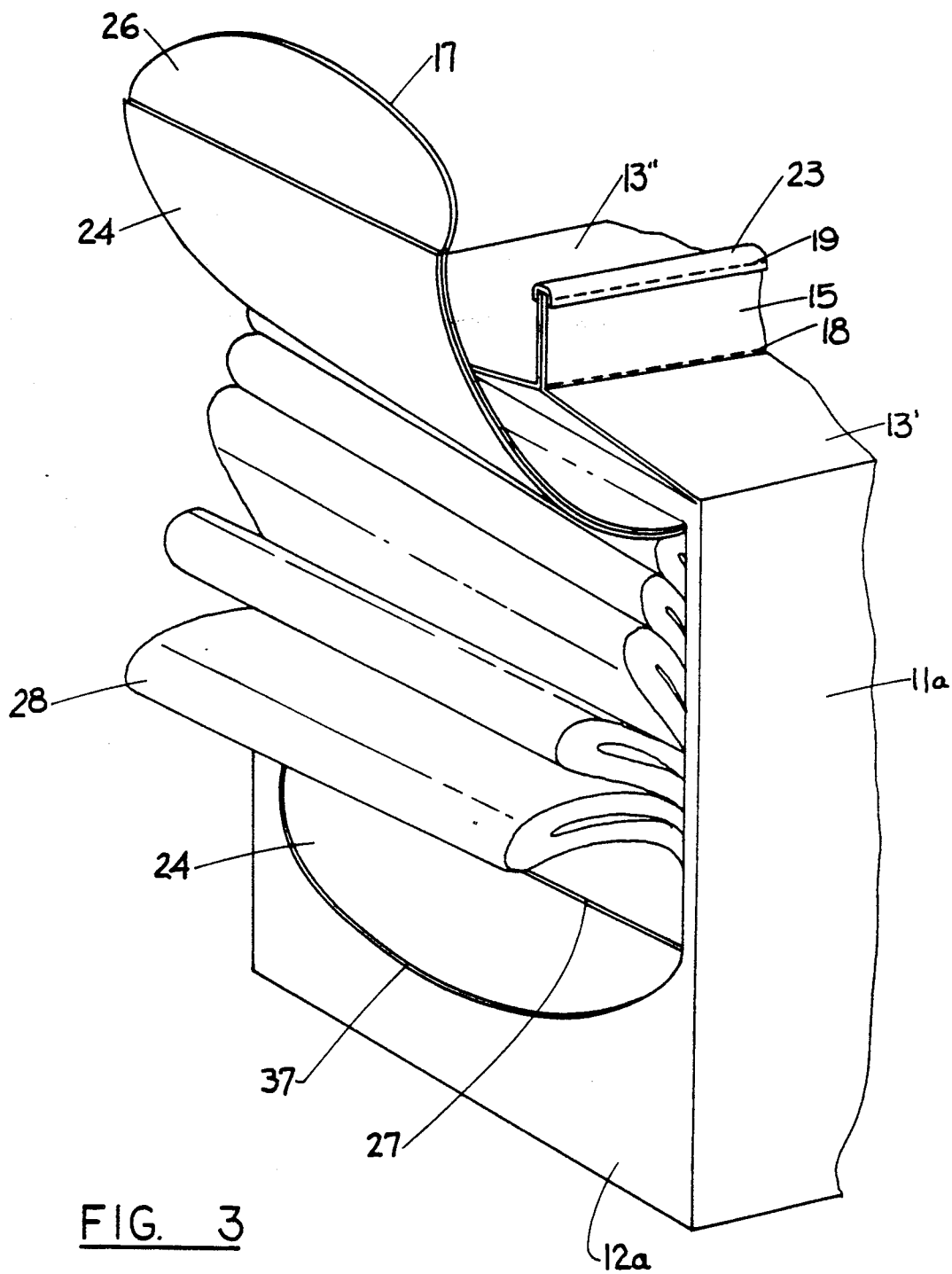
FIG. 3 is a fragmentary perspective view of the preferred embodiment of FIGS. 1 and 2, but with the opening device partially torn upwards so that the first compressed articles are being released.

The opening device which is shown in FIG. 1 is positioned in side gusset/side panel (12a). It is positioned perpendicular to the compression direction of the flexible articles packed in the paper bag so that, after opening of the device, the compressed articles (28) are released and can be taken out one after the other without unnecessary tearing of the paper bag, which continues to protect the unused articles it still contains, as can be seen from FIG. 3.

Figure 2:
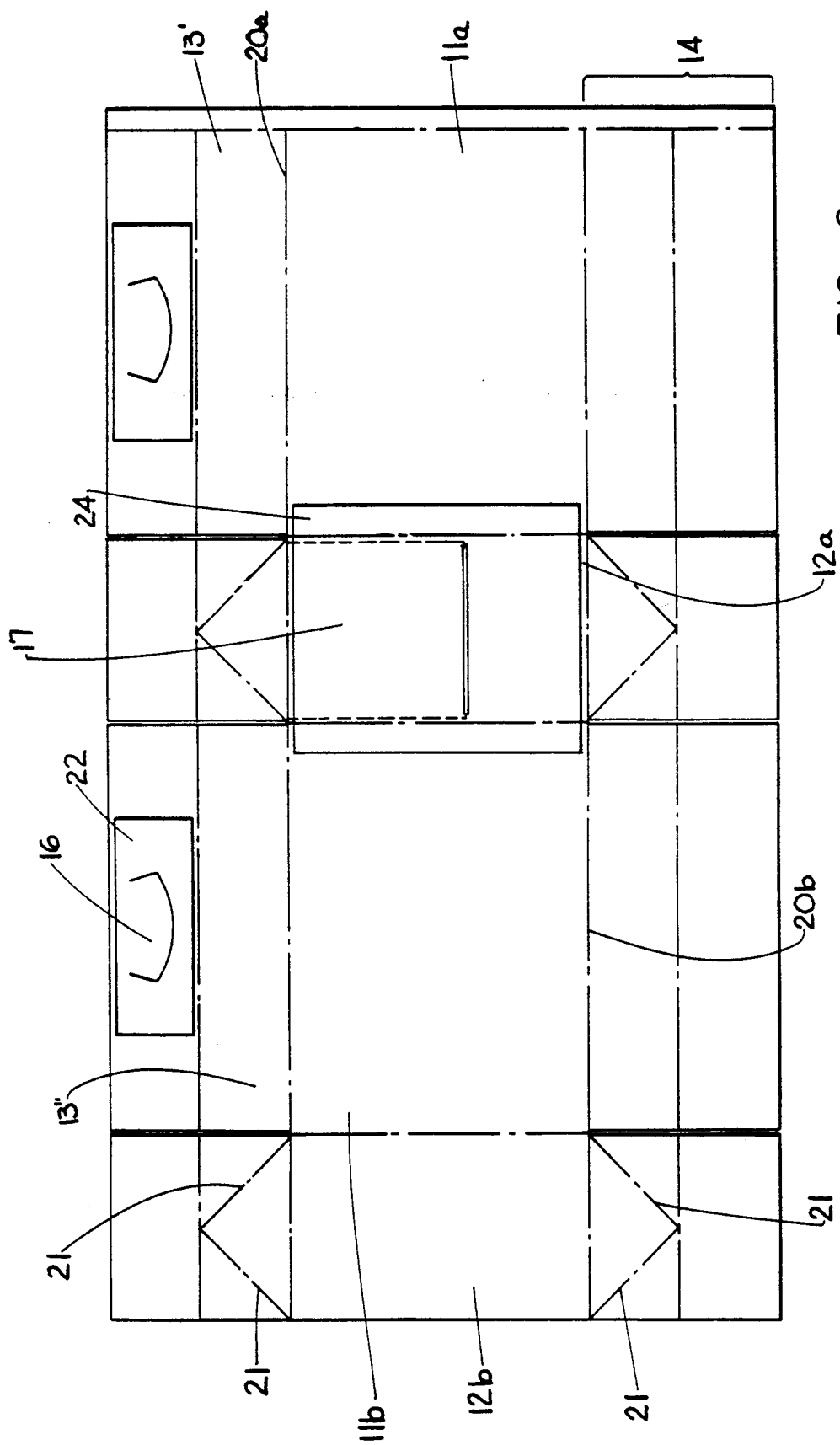
FIG. 2 is a flat blank of the one or two-layer paper before it is formed into a bag.
Figure 4:
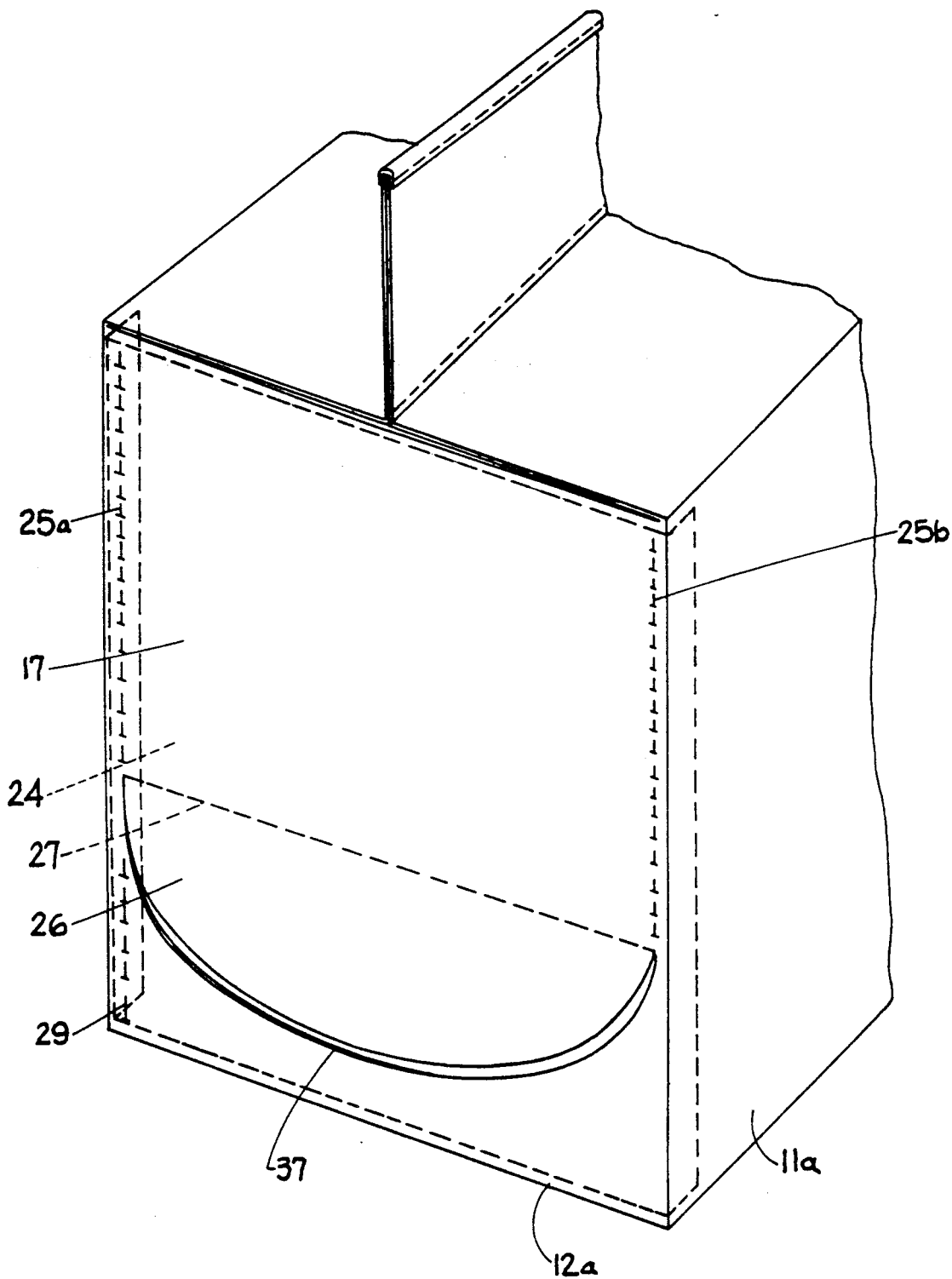
FIG. 4 is a fragmentary perspective view of the package according to the invention, showing a preferred embodiment of an opening device.

The preferred opening device (17) shown in FIGS. 2 and 4 consists of an internal reinforcement sheet (24) made of a suitable biodegradable and/or recyclable material like paper, light board, cotton cloth, etc.; vertical lines of weakness which preferably comprise perforations (25a and 25b) and a tear flap (26). The reinforcement sheet (24) is glued to the inside of the bag at least on the side panel (12a) in which the opening device (17) is foreseen, but can be of a sufficient width to overlap the folds between side panel (12a) and front panel (11a) and back panel (11b). A horizontal slit (27) is provided in reinforcement sheet (24) between and at the the lower end of the vertical perforations (25). A shaped cutting (37) is provided in the bag in order to generate a tear flap (26). The tear flap is glued 1 to 5 mm below the slit in order to ensure that the bag is perfectly closed. No glue is applied on the reinforcement sheet (24) in the area coinciding with the loose flap cut-out (26) foreseen in the paper bag.

The size and shape of the opening device (17) is a function of the compression ratio of the flexible articles packed in the paper bag. For highly compressed articles, the size of the opening can be increased by extending perforations (25a or 25b) as at (29). These additional perforations (29) will tear when the bag is opened as described above and upon removal of the first highly compressed article, thereby leaving a triangular area at the bottom of side panel (12a) which will prevent the following articles from falling outside the paper bag.

By gluing the reinforcement sheet (24) to the surface of side panel (12a) facing inwardly, three major advantages are obtained. First, the bridges of the perforations (25a, 25b, 29) are reinforced so that they do not burst open under the pressure of the compressed flexible articles contained in the paper bag, especially when the filled package undergoes careless or severe handling, whereas these bridges can still be smoothly and easily opened along the perforation at the time this is desired. Furthermore, once the perforations have been broken open, the part of the reinforcement sheet (24) remaining glued to the part of the side panel delimiting the opening after opening device (17) is partially torn out, is providing a reinforcement along the edge of this opening, the edges of which will not tear or break when the compressed articles are removed from the bag. Additionally, it may be advantageous to coat the side of the reinforcement sheet (24) facing the packaged flexible articles with a recyclable compatible coating in order to reduce friction between the flexible articles and the paper bag when removing the first few articles from the bag.

Figure 5:
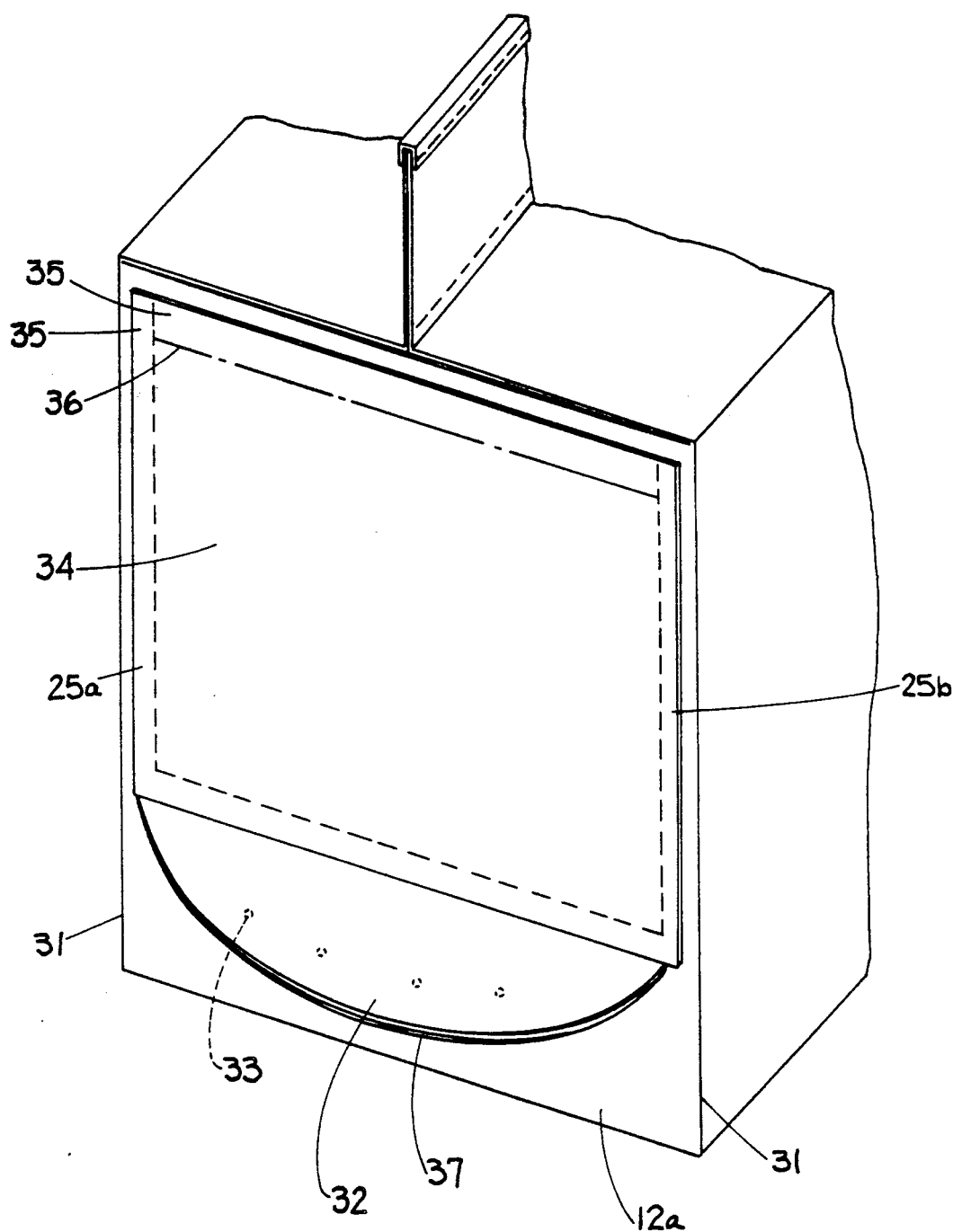
FIG. 5 shows a fragmentary perspective view of the package according to the invention, showing another preferred opening device.

The opening device shown in FIG. 5 works along the same principle as the one described in FIG. 4 but provides a protective sheet (35) made of a suitable biodegradable and/or recyclable material like paper, light board, cotton cloth, etc. on the outside of side panel (12a) over vertical perforations (25a and 25b) and horizontal slit (27). This protective sheet is attached with a releasable glue into the area along the vertical sides of perforations and between these perforations and the vertical edges (31) of the side panel (12a), which area has been coated with varnish, whereas it is permanently glued to the unvarnished area (34) located between said perforations. A loose extension flap (32) hinges at the bottom end of the protective sheet and is secured with hot melt dots (33) to the side panel (12a), to avoid accidental opening. Hinge (36) defines the upper part of the protective sheet. It can be replaced by a perforation, which would mean that, upon opening of the bag, the entire opening device would be removed, provided that the protective sheet is attached with a releasable glue also above said perforation. At the time the package is to be opened, it will be sufficient to detach the hot melt dots of the loose flap (32) and, with an upward pull, break the perforations defining area (34).

Figure 6:
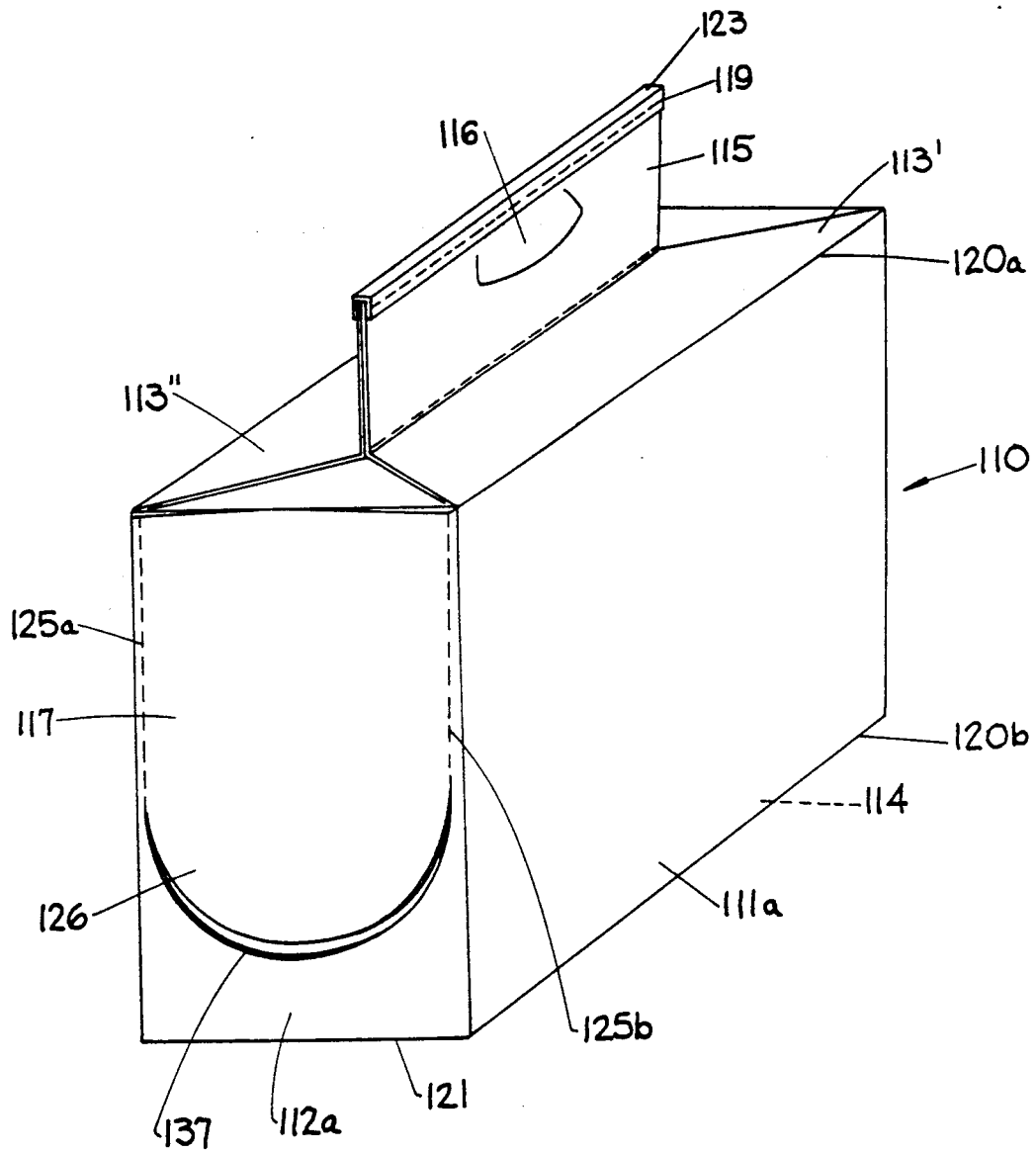
FIG. 6 is a perspective view of a preferred embodiment of the package consisting of a top gussetted paper bag compactly packing compressed flexible articles.

Although the present invention has been described in conjunction with a side gussetted bag, it will be clearly understood from FIG. 6 that it works equally well with a top gussetted bag (110), the manufacturing of which is well-known to the man of ordinary skill in the art. The numerals used in FIG. 6 show the same features as described in the previous figures with like numerals. It will be evident that the embodiments of opening devices illustrated in FIGS. 4 and 5 can be equally provided on the top gussetted bag (110) shown in FIG. 6.

While the preferred embodiment describes a perforated opening device, it is also possible to replace the vertical perforation (25a and 25b) by tear strings made of recyclable material (like paper, cotton strings or a combination). In this case, the size of the internal reinforcement sheet can be reduced to just cover the cutting (37, 137) that generates the loose flap as there are no vertical perforations to protect anymore.

The opening devices shown in the attached figures have a loose flap hinged at the lower edge of the opening device, to be detached with an upward pull. Opening devices where the loose flap is hinged to the upper side of the part to be detached with a downward pull are of course also encompassed by the invention. Furthermore, it may be advantageous to coat part of this loose flap facing the bag with a releasable glue so that it can be repeatedly attached on and detached from the area of the side panel against which it normally lies when the bag is still unopened, thereby allowing partial reclosing of the bag. In that case, the area of the side panel corresponding to the area of the flap that has been provided with a releasable glue, should be suitably treated, like with a recyclable varnish coating.

While the preferred embodiment describes a carrying device with a reinforcement made of a biodegradable and/or recyclable material, it is also possible to position the sewing line defining the limit of the extension in which the grip hole is provided sufficiently close to the upper end of this grip hole, so that possible tearing of this grip hole is stopped by the cotton string used for sewing, thereby eliminating the need for this reinforcement.

Whereas, in the above preferred embodiment, reference is made to cotton string when sewing in specific locations is desired, any other natural material of which string can be made is, of course, also encompassed. Examples are silk, jute, wool, etc.

While the preferred embodiment describes a side gussetted bag, it is also possible to make a top gussetted bag construction as shown in FIG. 6.

Various modifications of the described invention will be apparent to those skilled in the art. Examples of some such variations have been mentioned above. Accordingly, the scope of the present invention should be considered in terms of the following claims and is understood not to be limited to details or structures described and shown in the specification and drawings.

What is claimed is:

1. A substantially rectangular paper package containing compressed flexible articles, said paper package comprising:
   (a) a front and a back panel connected to one another by means of a pair of side panels, a bottom panel and a top panel;
   (b) an opening device comprising a pair of vertical lines of weakness located within one of said side panels of said paper package, said vertical lines of weakness defining a predetermined portion of said side panel to be at least partially separated from the remainder of said side panel without releasing the tension in the remainder of said side panel, said predetermined portion of said side panel being partially separated by applying a grasping force to a tear flap extending from the lowermost end of said opening device, whereupon said flexible articles coinciding with the aperture thus formed in said side panel expand through said aperture in a fan-like array while the portion of said flexible articles coinciding with the remaining tensioned portion of said side panel are retained in a substantially compressed condition; and (c) an internal reinforcement sheet comprised of biodegradable and/or recyclable material located on the innermost surface of said opening device and said tear flap and extending at least over the entire area of said opening device and beyond said vertical lines of weakness, said reinforcement sheet having a horizontal slit extending continuously between said vertical lines of weakness and substantially coinciding with the lowermost end of said opening device and the uppermost end of said tear flap.

2. The paper package of claim 1, wherein said vertical lines of weakness located on said side panel and defining limits of said opening device comprise a pair of vertical perforations.

3. The paper package of claim 1, wherein said vertical lines of weakness located on said side panel and defining limits of said opening device comprise a pair of vertical strings made of recyclable material.

4. The paper package of claim 1, wherein said internal reinforcement sheet made of biodegradable and/or recyclable material is provided on the outside of said side panel containing said opening device and extends over the entire area of said opening device covering said vertical lines of weakness and said horizontal slit defining the area of said opening device.

5. The paper package of claim 4, wherein said tear flap extends from the lowermost end of said opening device is coated with a releasable glue on part of its side facing said paper package allowing said tear flap to be repeatedly attached and detached to the corresponding area of said side panel against which it normally lies when said paper package is unopened.

6. The paper package of claim 1, further comprising a carrying device in an extension of said top panel of said paper package.

7. The paper package of claim 6, wherein said carrying device is reinforced with a layer of biodegradable and/or recyclable material.

8. The paper package of claim 7, further comprising a U-shaped biodegradable and/or recyclable protective member to be slid over the free top edges of said carrying device and attached by a sewing line.

9. The paper package of claim 8, wherein said carrying device is located close to said sewing line.

10. A substantially rectangular paper package containing compressed flexible articles, said paper package comprising:

(a) a front and a back panel connected to one another by means of a pair of side panels, a bottom panel and a top panel;

(b) an opening device comprising a pair of vertical lines of weakness located within one of said side panels of said paper package, said vertical lines of weakness defining a predetermined portion of said side panel to be at least partially separated from the remainder of said side panel without releasing the tension in the remainder of said side panel, said predetermined portion of said side panel being partially separated by applying a grasping force to a tear flap extending from the lowermost end of said opening device, whereupon said flexible articles coinciding with the aperture thus formed in said side panel expand through said aperture in a fan-like array while the portion of said flexible articles coinciding with the remaining tensioned portion of said side panel are retained in a substantially compressed condition; and (c) an internal reinforcement sheet comprised of biodegradable and/or recyclable material located on the innermost surface of said side panel comprising said opening device and said tear flap, said reinforcement sheet substantially coinciding with said tear flap having an uppermost end substantially coinciding with the lowermost end of said opening device and the uppermost end of said tear flap.

11. The paper package of claim 10, wherein said vertical lines of weakness located on said side panel and defining limits of said opening device comprise a pair of vertical perforations.

12. The paper package of claim 10, wherein said vertical lines of weakness located on said side panel and defining limits of said opening device comprise a pair of vertical strings made of recyclable material.

13. The paper package of claim 10, wherein said tear flap extends from the lowermost end of said opening device is coated with a releasable glue on part of its side facing said paper package allowing said tear flap to be repeatedly attached and detached to the corresponding area of said side panel against which it normally lies when said paper package is unopened.

14. The paper package of claim 10, further comprising a carrying device in an extension of said top panel of said paper package.

15. The paper package of claim 14, wherein said carrying device is reinforced with a layer of biodegradable and/or recyclable material.

16. The paper package of claim 15, further compressing a U-shaped biodegradable and/or recyclable protective member to be slid over the free top edges of said carrying device and attached by a sewing line.

17. The paper package of claim 16, wherein said carrying device is located close to said sewing line.

18. A substantially rectangular paper package containing compressed flexible articles, said paper package comprising:

(a) a front and a back panel connected to one another by means of a pair of side panels, a bottom panel and a top panel;

(b) a carrying device extending from said top panel;

(c) an opening device comprising a pair of vertical lines of weakness located within one of said side panels of said paper package, said vertical lines of weakness defining a predetermined portion of said side panel to be at least partially separated from the remainder of said side panel without releasing the tension in the remainder of said side panel, said predetermined portion of said side panel being partially separated by applying a grasping force to a tear flap extending from the lowermost end of said opening device, whereupon said flexible articles coinciding with the aperture thus formed in said side panel expand through said aperture in a fan-like array while the portion of said flexible articles coinciding with the remaining tensioned portion of said side panel are retained in a substantially compressed condition; and (d) an internal reinforcement sheet comprised of biodegradable and/or recyclable material located on the innermost surface of said side panel comprising said opening device and said tear flap, said reinforcement substantially coinciding with said tear flap having an uppermost end substantially coinciding with the lowermost end of said opening device and the uppermost end of said tear flap.

19. The paper package of claim 18, wherein said vertical lines of weakness located on said side panel and defining limits of said opening device comprise a pair of vertical perforations.

* * * * *